D. E. LEWELLEN.
THRUST BEARING.
APPLICATION FILED MAR. 18, 1920.
1,422,585.
Patented July 11, 1922.
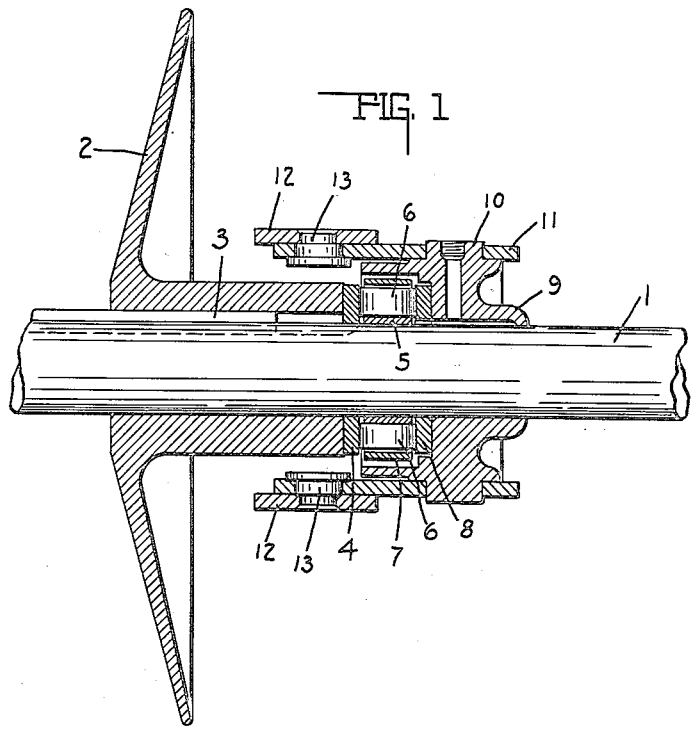
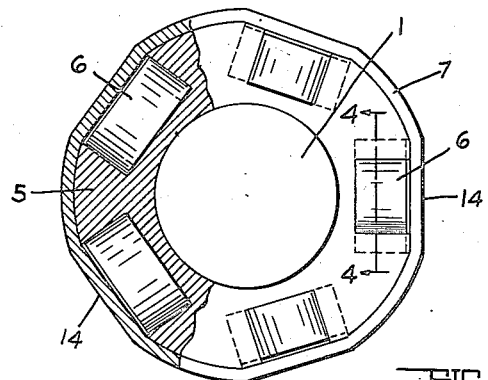
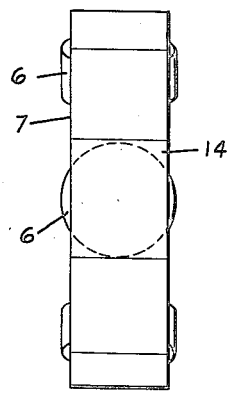
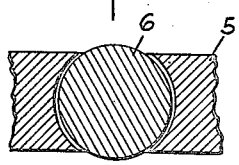
INVENTOR.
Darcy E. Lewellen
BY
Bedford, Morrill & Bierce
ATTORNEYS.

UNITED STATES PATENT OFFICE.

DARCY E. LEWELLEN, OF COLUMBUS, INDIANA, ASSIGNOR TO LEWELLEN MANUFACTURING COMPANY, OF COLUMBUS, INDIANA, A CORPORATION OF INDIANA.

THRUST BEARING.

1,422,585.

Specification of Letters Patent.

Patented July 11, 1922.

Application filed March 18, 1920. Serial No. 366,748.

*To all whom it may concern:*

Be it known that I, DARCY E. LEWELLEN, a citizen of the United States, residing at Columbus, in the county of Bartholomew and State of Indiana, have invented certain new and useful Improvements in Thrust Bearings, of which the following is a specification.

This invention relates to thrust bearings adapted for various purposes, but intended more particularly to be used in variable speed transmission mechanisms utilizing cone-shaped disks having a wedge-shaped belt operating therebetween and producing and pressure or thrust on the bearings. Such a device is described and claimed in my co-pending application, Serial No. 366,747, filed March 18, 1920, for variable speed transmission. It is among the objects of this invention to produce a thrust bearing having relatively few parts, in which the load is distributed among several points, which is simple, the parts of which are easily replaced, and which is thoroughly reliable.

In carrying the objects of my invention into effect, I provide a plurality of flat rollers held in a cage loosely mounted on a shaft. Preferably the rollers are so arranged that a roller is diametrically opposite a space thus forming a bearing in which there are at least three points of contact at all times. I usually accomplish this by providing an odd number of rollers equally spaced. The cage is generally so formed that the rollers are simply dropped in place and a retaining band having flattened portions for the rollers is placed thereover to keep the rollers in place.

Referring to the accompanying drawings forming a part hereof, and in which similar reference characters denote similar parts, Figure 1, represents a vertical section through a disk having one of my thrust bearings in place, Figure 2, an end view of a bearing, some parts being shown in section, Figure 3, a top view of a bearing, and Figure 4, a section along line 4—4 of Figure 2.

The shaft 1 has a disk fitted thereon for longitudinal motion by means of key 3. A ring 4 preferably of hardened steel is mounted on shaft 1 against the end of the hub of disk 2. A cage 5 also loosely mounted on shaft 1 has a series of recesses along its periphery in which are placed flat topped rollers 6 which constitute the anti-friction portion of the bearing. A retaining band 7 is secured to the cage 5 and serves to hold the rollers in place.

A second ring 8 also of hardened steel is mounted on the shaft and abuts the opposite face of the cage. An end member 9 having a boss 10 is mounted against the other side of ring 8 and serves to take up the thrust caused by disk 2. Upon boss 10 is pivoted a link 11 which is secured to operating lever 12 by means of pivot 13 for a purpose described in my co-pending application above referred to. The retaining band 7 is preferably flattened, as shown at 14, so that the flat tops of rollers 6 will bear along practically the entire exposed surface thereof.

I have here shown five rollers equally spaced about the periphery of the cage. It is to be understood that the number may be varied, but I preferably provide an odd number and space them so that a roller is diametrically opposite a space in order to avoid having the entire thrust bear upon one or two points, as is often the case when an even number of rollers is used by constructing and assembling the cage 5 and rollers 6 in the manner shown, rollers of relatively large axial diameter may be used with a cage of relatively small circumference.

Having thus fully described my said invention, what I claim as new and desire to secure by Letters Patent, is:

1. A thrust bearing comprising a cage of relatively small circumference mounted on a shaft, an odd number of rollers of relatively large axial diameter spaced therein and having their ends flat, a retaining band for said rollers having portions in registration with the rollers inwardly bent and flattened to provide bearing surfaces over the entire end surfaces of the rollers, and bearing rings placed on both sides of said cage.

2. A thrust bearing comprising a cage of relatively small circumference mounted on a shaft, an odd number of rollers of relatively large axial diameter spaced therein, a retaining band having inwardly bent flattened portions immediately over said rollers, bearing rings placed on both sides of said cage, a disk member contacting with one of said rings, and an end member to receive the thrust of said disk.

3. A thrust bearing comprising a cage of relatively small circumference having a series of spaced recesses around its periphery, a roller of relatively large axial diameter fitting in each of said recesses and having its ends flat and at right angles to its axis, the edge face of said cage being flattened at the bottom of each recess, and a band adapted to extend around the periphery of said cage for retaining the rollers in the recesses, said band being bent inwardly at points in registration with the flat spaces on the cage and said bent-in portions flattened and extended in line with the flat ends of the rollers to form bearings whereby the entire outer end surfaces of the rollers will be engaged by said inwardly bent portions.

In witness whereof, I have hereunto set my hand and seal at Indianapolis, Indiana, this 11th day of March, A. D. nineteen hundred and twenty.

DARCY E. LEWELLEN. [L. S.]

Witnesses:
H. C. BIERMAN,
M. L. SHULER.